United States Patent
Nguyen et al.

(10) Patent No.: US 11,509,773 B2
(45) Date of Patent: Nov. 22, 2022

(54) SYSTEMS AND METHODS OF ECHO REDUCTION

(71) Applicant: SEMICONDUCTOR COMPONENTS INDUSTRIES, LLC, Phoenix, AZ (US)

(72) Inventors: Thi Hong Thu Nguyen, Ichinomiya (JP); Kozo Okuda, Hirakata (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 22 days.

(21) Appl. No.: 17/190,973

(22) Filed: Mar. 3, 2021

(65) Prior Publication Data

US 2022/0286561 A1 Sep. 8, 2022

(51) Int. Cl.
*H04M 9/08* (2006.01)
*H04R 3/00* (2006.01)
*H04R 3/02* (2006.01)

(52) U.S. Cl.
CPC ............ *H04M 9/082* (2013.01); *H04R 3/005* (2013.01); *H04R 3/02* (2013.01)

(58) Field of Classification Search
CPC .............................. H04M 9/082; H04M 9/085
USPC ........................................ 379/406.08, 406.06
See application file for complete search history.

(56) References Cited

U.S. PATENT DOCUMENTS

| 9,036,815 | B2 * | 5/2015 | Lee | H04B 3/235 |
| | | | | 379/406.08 |
| 2003/0007633 | A1 * | 1/2003 | Tucker | H04B 3/234 |
| | | | | 379/406.08 |
| 2006/0147032 | A1 | 7/2006 | McCree et al. | |
| 2007/0280472 | A1 * | 12/2007 | Stokes III | H04S 7/305 |
| | | | | 379/406.01 |
| 2009/0046866 | A1 * | 2/2009 | Feng | H04M 9/082 |
| | | | | 381/66 |

(Continued)

OTHER PUBLICATIONS

Feiran Yang et al., "Statistical Convergence Analysis for Optimal Control of DTF-Domain Adaptive Echo Canceler," IEEE/ACM Transactions on Auio, Speech, and Language Processing, vol. 25, No. 5, May 2017.

(Continued)

*Primary Examiner* — Alexander Krzystan
(74) *Attorney, Agent, or Firm* — Dickinson Wright PLLC; Mark E. Scott

(57) ABSTRACT

Echo reduction. At least one example embodiment is a method including producing, by a loudspeaker, acoustic waves based on a far-microphone signal; receiving, at a local microphone, an echo based on the acoustic waves, and receiving acoustic waves generated locally, the receiving creates a local-microphone signal; producing an estimated-echo signal based on the far-microphone signal and a current step-size parameter; summing the local-microphone signal and the estimated echo signal to produce a resultant signal having reduced echo in relation to the local-microphone signal; and controlling the current step-size parameter. The controlling current step size may include: calculating a convergence value based on a cross-correlation of the local-microphone signal and the resultant signal; and updating the current step-size parameter based on the convergence value.

17 Claims, 5 Drawing Sheets

(56) References Cited

U.S. PATENT DOCUMENTS

2013/0322638 A1 12/2013 Lee et al.
2016/0134759 A1* 5/2016 Mani ..................... H04B 3/237
   379/406.08

OTHER PUBLICATIONS

Christian Schuldt et al., "A Delay-Based Double-Talk Detector," IEEE Transactions on Audio, Speeech, and Language Processing, vol. 20, No. 6, Aug. 2012.
Raymond H. Kwong et al., "A Variable Step Size LMS Algorithm," IEEE Transactions on Signal Processing, vol. 40, No. 7, Jul. 1992.

* cited by examiner

SYSTEMS AND METHODS OF ECHO REDUCTION

CROSS-REFERENCE TO RELATED APPLICATIONS

Not Applicable.

BACKGROUND

Many communication devices (e.g., desk telephones, laptop computers, mobile electronic devices) have a "hands free" mode in which audio from a distant location is reproduced on a local loudspeaker for a user. The user may verbally respond, and the verbal response is detected by a local microphone and sent back to the distant location. However, the audio reproduced by the local loudspeaker is also detected by the local microphone, which can generate echoes in the signal sent to the distant location. In order to reduce the echo in the audio signal returned to the distant location, the communication device may implement echo cancellation in the audio signal produced by the local microphone before sending the audio signal as a return signal to the distant location.

BRIEF DESCRIPTION OF THE DRAWINGS

For a detailed description of example embodiments, reference will now be made to the accompanying drawings in which.

DEFINITIONS

Figure 1:
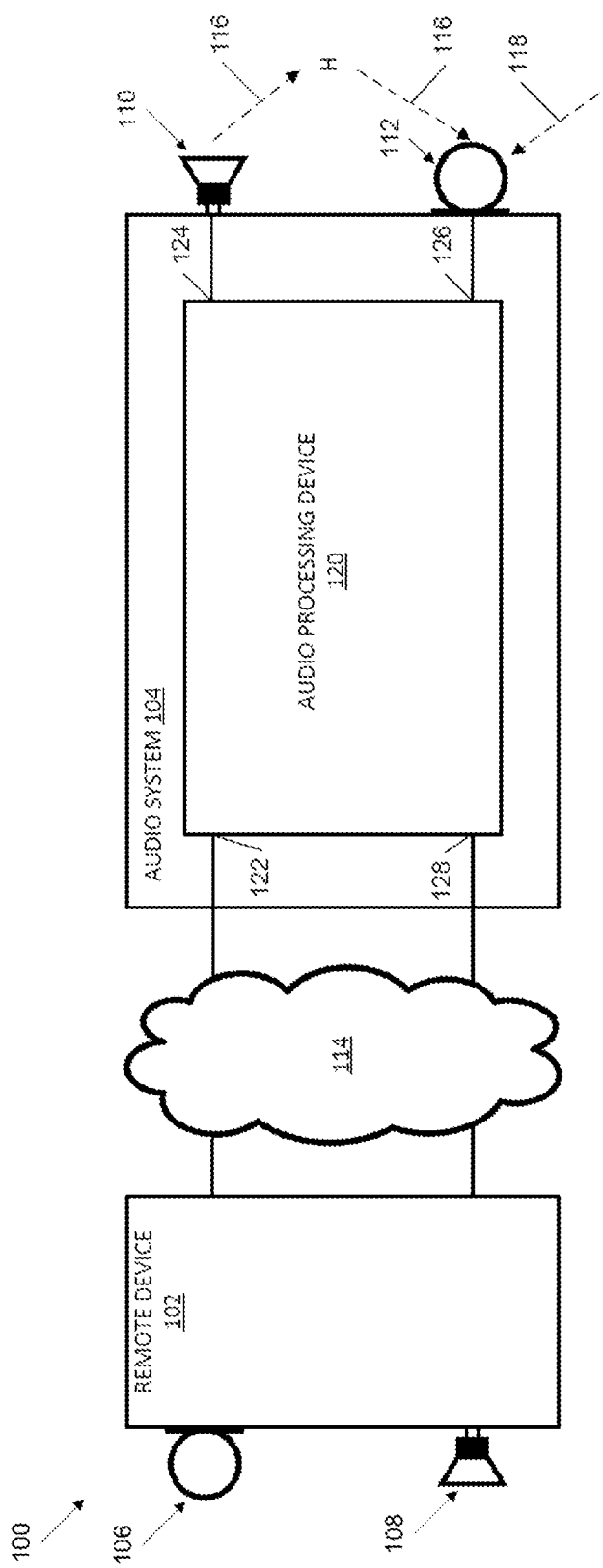
FIG. 1 shows a block diagram of a communication system in accordance with example embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical or software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software (e.g., executed on processor or microcontroller), these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"About" in reference to a recited value shall mean the recited value plus or minus five percent (+/−5%) of the recited value.

"Controller" shall mean, alone or in combination, individual circuit components, an application specific integrated circuit (ASIC), a processor with controlling software (e.g., a reduced-instruction-set computing (RISC) processor core), a microcontroller with controlling software, a digital signal processor (DSP) with controlling software, a programmable logic device (PLD), or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to systems and methods of echo reduction. More particularly, in some examples an audio processing device performs echo reduction by controlling a step-size parameter based on a cross-correlation of a local-microphone signal received by a local microphone with a resultant signal from a previous iteration of the echo reduction. More particularly still, in one example the audio processing device performs the cross-correlation in the frequency domain, and creates a convergence value based on a resultant cross-correlation spectrum. The step-size parameter may then be updated based on the convergence value. In this way, during periods of time when the audio processing device is performing initial convergence, larger step-sizes may be used. As the echo reduction converges, the audio processing device uses smaller step-size parameters to avoid overshoot and/or oscillation. The description turns to an example system to orient the reader.

FIG. 1 shows a block diagram of an example communication system 100. In particular, FIG. 1 shows a communication system 100 comprising a distant or remote device 102 and a local device designated as an audio system 104. The remote device 102 comprises a microphone 106 and a loudspeaker 108. The audio system 104 comprises a loudspeaker 110 and a microphone 112. In operation, the microphone 106 at the remote location picks up audio in the vicinity of the remote device 102, and sends an audio signal to the audio system 104. To help differentiate the audio signal from the remote device from other audio signals to be introduced below, the audio signal from the remote device is referred to as a "far-microphone signal." The audio system 104, in turn, produces acoustic waves (i.e., sound) by way of the loudspeaker 110 based on the far-microphone signal such that listeners near the audio system 104 can hear the sounds.

In many cases, the local listeners near the audio system 104 may respond to what is heard from the loudspeaker 110, and thus the local listeners near the audio system 104 may create acoustic waves (i.e., sound) that is picked up by the microphone 112. Microphone 112 thus produces an audio signal termed a local-microphone signal, and the local-microphone signal may be sent to the remote device 102. The loudspeaker 108 at the remote device 102, in turn, may generate acoustic waves (i.e., sound) based on the local-microphone signal created by the microphone 112.

The audio system 104 may take any suitable form. For example, the audio system 104 may be a plain-old-telephone-service (POTS) device, and in the example case the local-microphone signal may be an analog signal transferred to the remote device 102 by way of a communication channel 114 in the form of a traditional telephone service. In other cases, the audio system 104 may be an internet protocol (IP) phone which receives the local-microphone signal, encodes the local-microphone signal in a digital format, and sends the encoded signals in the form of packet-based messages. Relatedly, the IP phone may receive the far-microphone signal in a digital format (e.g., receiving by packet-based messages), decode the far-microphone signal, and produce sound by way of the loudspeaker 110. In the example case of the audio system 104 being an IP phone, the communication channel 114 may be, in whole or in part, the Internet.

In yet still other cases, the audio system 104 may be a computer (e.g., desktop, laptop) which also encodes the local-microphone signal in a digital format and sends the encoded signals in the form of packet-based messages. Relatedly, the computer may receive the far-microphone signal in a digital format (e.g., receiving by packet-based messages), decode the far-microphone signal, and produce sound by way of the loudspeaker 110. In the example case of the audio system 104 being a computer, the communication channel 114 may also be, in whole or in part, the Internet.

In yet still other cases, the audio system 104 may be a mobile computing device (e.g., cellular telephone, tablet device) which encodes the local-microphone signal in a digital format and sends the encoded signals in the form of packet-based messages. Relatedly, the mobile computing may receive the far-microphone signal in a digital format (e.g., receiving by packet-based messages), decode the far-microphone signal, and produce sound by way of the loudspeaker 108. In the example case of the audio system 104 being a mobile computing device, the communication channel 114 may be, in whole or in part, the data network associated with the cellular telephone network.

Still referring to FIG. 1, and now considering the remote device 102. The remote device 102 may take any suitable form, such as a POTS telephone, an IP phone, a computer, or a mobile computing device. It follows that the remote device 102 may receive the local-microphone signal in various forms, such as an analog signal or a digital signal encoded using any suitable encoding scheme. Relatedly, the far-microphone signal created in part by the microphone 106 may be sent to the audio system 104 in any suitable form, such as an analog signal or digital signal encoded in any suitable encoding scheme.

Considering again the audio system 104, when the loudspeaker 110 produces acoustic waves, the acoustic waves may travel to and be incident on the microphone 112, such as directly incident or incident by way of reflection of the acoustic waves in the local environment. Such a direct or reflected acoustic wave being incident upon the microphone 112 is shown in FIG. 1 by dashed lines 116, and will hereafter be referred to as echo 116. The acoustic path or channel through the local environment of such acoustic waves is labelled as H in the figure. It follows that the microphone 112 may detect or pick up both acoustic waves generated locally (hereafter local sounds 118) and the echo 116. If the local-microphone signal is sent without further processing, the acoustic waves reproduced at the remote location by the loudspeaker 108 will contain the echo (e.g., what the person at the remote location said into the microphone 106 a fraction of second earlier), making the local sounds 118 difficult to discern or understand at the remote device 102. The same issue occurs with respect to echoes in the vicinity of the remote device 102, but are not specially addressed so as not to further complicate the discussion. In accordance with example embodiments, the audio system 104 implements echo cancellation or echo reduction to remove or reduce the echo from the local-microphone signal, and thus what is sent to the remote device 102 is a resultant signal in which the echo is reduced or eliminated.

Still referring to FIG. 1, the example audio system 104 comprises an audio processing device 120. In one example, the audio processing device 120 is a packaged integrated circuit device or packaged semiconductor device designed and constructed to implement some or all the features associated with receiving the far-microphone signal, producing acoustic waves by the loudspeaker 110 based on the far-microphone signal, generating a local-microphone signal from the microphone 112, performing echo reduction with respect to the local-microphone signal, and generating a resultant signal that is sent to the remote device 102 by way of the communication channel 114.

The example audio processing device 120 comprises an audio-input port 122, an audio-output port 124, a microphone port 126, and a resultant port 128. The audio-input port 122 may be one or more electrical terminals defined on or through the package of the packaged semiconductor device. For example, the audio-input port 122 may be single terminal, a group of two or more terminals (e.g., two analog terminals), or a set of terminals defining the busses of a serial or parallel communication bus. The resultant port 128 may be one or more electrical terminals defined by or through the packaged semiconductor device. For example, the resultant port 128 may be single terminal, a group of two or more terminals, or a set of terminals defining the busses of a serial or parallel communication bus. The audio-output port 124 may be one or more electrical terminals defined by or through the packaged semiconductor device. In one example the audio processing device 120 directly drives the loudspeaker 110, and thus the audio-output port 124 may be two terminals across which an analog signal is driven by the audio processing device 120. In other examples, the audio-output port 124 may carry the far-microphone signal to downstream devices in digital form, and thus the audio-output port 124 may be a plurality of terminals that form the bus lines for a serial or parallel communications bus. The microphone port 126 may be one or more electrical terminals defined by or through the packaged semiconductor device. In one example the audio processing device 120 is coupled directly to the microphone 112 and receives the local-microphone signal in analog form, and thus the microphone port 126 may be two terminals across which the analog signal is received. In other examples, the microphone port 126 may couple to the microphone 112 in digital form, and thus the microphone port 126 may be a plurality of terminals that form the bus lines for a serial (e.g., Universal Serial Bus) or parallel communications bus.

Figure 2:
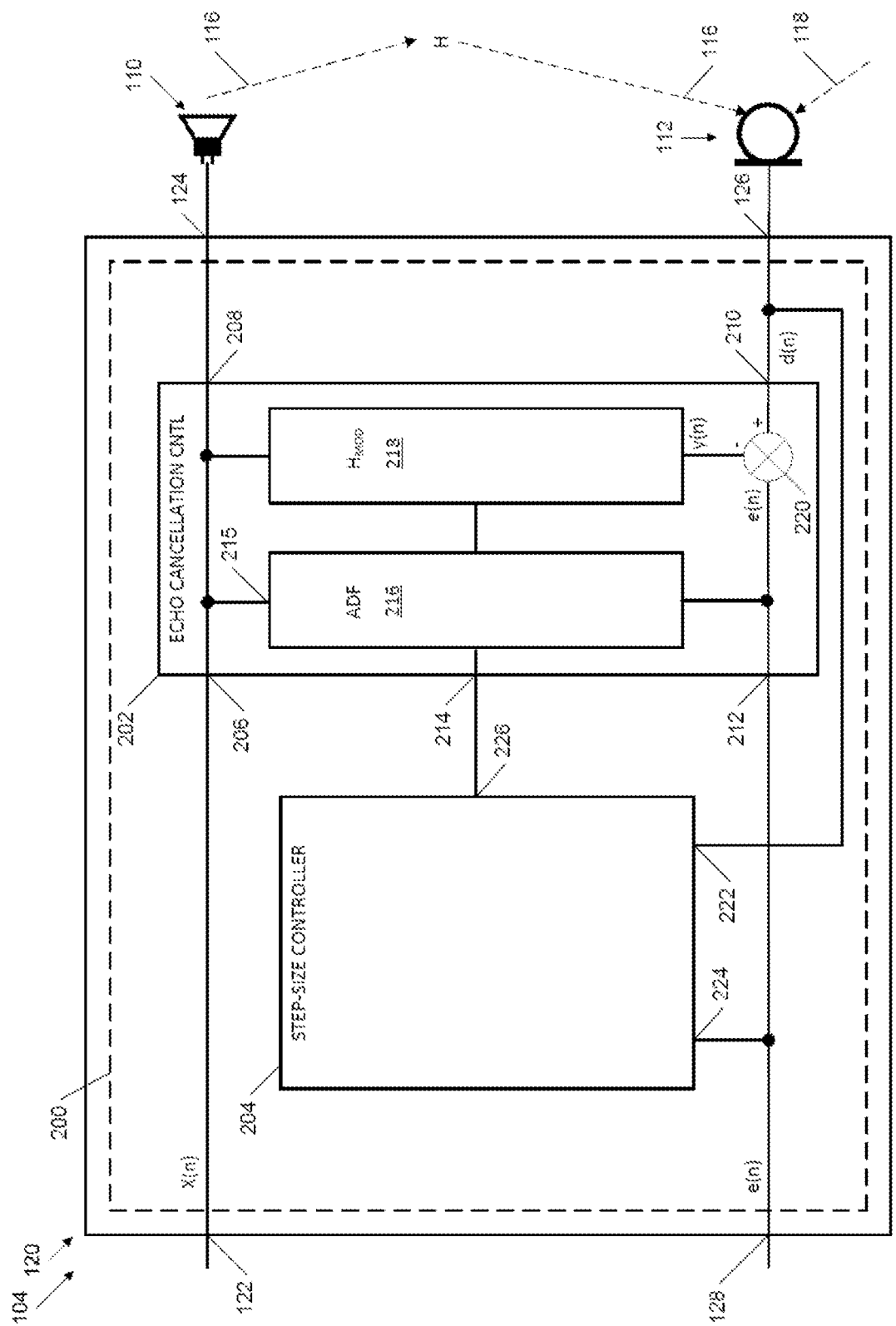
FIG. 2 shows a block diagram of an audio processing device in accordance with at least some embodiments.

FIG. 2 show a block diagram of an example audio processing device 120. In particular, FIG. 2 shows again the audio-input port 122, the audio-output port 124, the microphone port 126, and the resultant port 128. FIG. 2 also carries forward the loudspeaker 110 coupled to the audio-output port 124 and the microphone 112 coupled to the microphone port 126. FIG. 2 shows that the audio processing device 120 may comprise one or more substrates of semiconductor material (e.g., silicon), such as substrate 200 encapsulated within the packaging to create a packaged semiconductor device. Bond pads or other connection points on the substrate 200 couple to the terminals. While a single substrate 200 is shown, in other cases multiple substrates may be combined to form the audio processing device 120 (e.g., a multi-chip module).

The example audio processing device 120 may comprise an echo cancellation controller 202 and a step-size controller 204. The echo cancellation controller 202 may comprise an audio input 206 coupled to the audio-input port 122, an audio output 208 coupled the audio-output port 124, a microphone input 210 coupled to microphone port 126, a resultant output 212 coupled to the resultant port 128, and a step-size input 214. The echo cancellation controller 202 is designed and constructed to reduce the echo received on the microphone input 210 based on an audio signal received on the audio input 206 (e.g., the far-microphone signal) and a step-size parameter received on the step-size input 214. The echo cancellation controller 202 may be implemented in many forms. For example, in some cases the echo cancellation controller 202 may be an analog circuit constructed on the substrate 200 and designed to reduce the echo received on the microphone input 210. In other cases, the echo cancellation controller 202 may be implemented as software executing in a processor or microcontroller constructed on the substrate 200. In yet still other cases, the echo cancellation controller 202 may be implemented as digital signal processor (DSP) implemented on the substrate 200. Further still, the echo cancellation controller 202 may be combinations of the analog, digital, and/or software-based implementations.

The example echo cancellation controller 202 comprises an adaptive filter 216 (labeled ADF in the figure) and a channel model 218 (labeled $H_{MOD}$ in the figure). The adaptive filter 216 defines the step-size input 214, a signal input 215 coupled to the far-microphone signal, and is coupled to the resultant output 212. It follows the adaptive filter 216 receives a step-size parameter on the step-size input 214, the far-microphone signal on the signal input 215, and the resultant signal from the resultant output 212. Based on the step-size parameter, the far-microphone signal, and the resultant signal, the adaptive filter 216 creates a plurality of channel weights supplied to the channel model 218. The channel model 218 models the acoustic channel H between the loudspeaker 110 and the microphone 112 in order to estimate the echo 116. The example channel model 218 is coupled to the audio input 206, and thus receives the far-microphone signal. The channel model 218 is coupled to the adaptive filter 216, and thus receives the plurality of channel weights. The channel model 218 uses the plurality of channel weights to create an estimated echo signal based on the far-microphone signal, and the estimated echo signal is supplied to the summation block 220. The combination of the adaptive filter 216 and channel model 218 may take any suitable form, such as a normalized least-mean-square (NLMS) system, or any suitable after developed method and/or system that uses a variable magnitude step-size parameter to create an estimated echo signal from the far-microphone signal and the resultant signal.

The example echo cancellation controller 202 further comprises the summation block 220. The summation block 220 defines a sum input coupled to the microphone input 210 and thus the microphone 112, a second sum input coupled to the channel model 218 and thus the estimated echo signal, and a resultant output defining the resultant output 212. The summation block 220 sums the signals received with the polarities indicated in the figure. That is, in one example the summation block 220 subtracts the estimated echo signal generated by the channel model 218 (and adaptive filter 216) from the local-microphone signal created by the microphone 112. The resultant of the summation is coupled to the resultant output 212. The resultant signal may be sent to the remote device 102 (FIG. 1). In some senses, the resultant signal generated by the summation block 220 can be considered an error signal in the closed-loop control system implemented by the combination of the adaptive filter 216 and the channel model 218.

The example audio system 104 of FIG. 2 is shown in block diagram form, with single lines between blocks signifying electrical and/or communicative interconnections. The precise nature of the interconnections depends on the type of system implemented and the encoding scheme, if any, used. Some of the functions may be implemented in the analog form (e.g., driving the loudspeaker 110, or receiving an analog local-microphone signal). Other aspects of the functionality may be performed in the digital form (e.g., adaptive filter 216, channel model 218, summation block 220). So as not to unduly complicate the figure, various devices and systems for changing the nature of signals from one form to another (e.g., analog to digital, and vice-versa) are not shown. However, one of ordinary skill in the art, with the benefit of this disclosure, understands the concepts of analog and digital forms, and switching between the forms.

In order to assist in understanding mathematical concepts discussed below, FIG. 2 also shows mathematical terms associated with the various signals. For sampled signals, assume a sample interval of T, so that a relative time of a sample may be given by the following equation:

$$t = t_O + nT \quad (1)$$

where t is the sample time, to is an initial time, and n is an integer value (e.g., sample number). For simplicity then, the sample time t may be replaced with the integer n, as there is a direct correlation between the sample time t and sample number n. With this notation in mind, the far-microphone signal received on the audio-input port 122 is assigned x(n). The local-microphone signal is assigned d(n). The estimated-echo signal is assigned y(n). The error signal or resultant signal is assigned e(n). Each of these terms may be considered a mathematically array or a multi-dimensional vector.

Following the notation, the summation block 220 creates the resultant signal e(n) as follows:

$$e(n) = d(n) - y(n). \quad (2)$$

Similarly, the adaptive filter 216 and channel model 218 produce a channel estimation $H_{MOD}$ based on the sampled signals, and thus the channel estimation for each sample may be assigned the term $H_{MOD}(n)$. In accordance with some example systems, the channel estimation may be calculated as follows:

$$H_{MOD}(n+1) = H_{MOD}(n) + 2\mu e(n) x(n) \quad (3)$$

where $H_{MOD}(n+1)$ is the next channel estimation, $H_{MOD}(n)$ is the current and/or previous channel estimation, $\mu$ is a step-size parameter, and e(n) and x(n) are as defined above. The specification now turns to the step-size controller 204 and the step-size parameter p produced by the step-size controller 204.

The example step-size controller 204 defines an audio input 222 coupled to the microphone port 126, an error input 224 coupled to the resultant output 212, and a step-size output 226 coupled to the step-size input 214. The step-size controller 204 is designed and constructed to select and/or update a magnitude of the step-size parameter $\mu$ (hereafter, just to update the step-size parameter $\mu$) based on the resultant signal e(n) received on the error input 224 and the local-microphone signal d(n) received on the audio input 222. The step-size controller 204 then drives the step-size parameter to the step-size output 226. The step-size controller 204 may be implemented in many forms. For example, in some cases the step-size controller 204 may be an analog circuit constructed on the substrate 200 and designed to update the step-size parameter p. In other cases, the step-size controller 204 may be implemented as software executing in a processor or microcontroller constructed on the substrate 200. In yet still other cases, the step-size controller 204 may be implemented as a DSP constructed on the substrate 200. Further still, the step-size controller 204 may be combinations of the analog, digital, and/or software-based implementations.

In example cases, the step-size controller 204 calculates a cross-correlation of the local-microphone signal (received on the microphone port 126) and a resultant signal (received from resultant output 212). Using a resultant of the cross-correlation, the example step-size controller 204 creates a convergence value. Based on the convergence value, the step-size controller 204 updates the next step-size parameter p and drives the step-size parameter $\mu$ to the step-size output 226. In some cases, the step-size controller 204 is designed and constructed to convert the local-microphone signal from a time domain representation into a frequency domain representation to create a local-microphone spectrum. The step-size controller 204 may further convert the resultant signal from a time domain representation into a frequency domain representation to create a resultant spectrum. Thereafter, the step-size controller 204 may perform a cross-correlation of the local-microphone spectrum and the resultant spectrum to create a cross-correlation spectrum. Based on the cross-correlation spectrum, the step-size controller 204 creates the convergence value. Using the convergence value, the step-size controller 204 updates the next step-size parameter p. The convergence value may be single valued (changing each iteration of the calculation) that provides an indication of whether the echo reduction is converging toward lower overall echo component in the resultant signal (e.g., minimum echo), or is diverging. Moreover, the magnitude of the convergence value may provide an indication of the rate at which the echo reduction is converging or diverging. In example systems, arriving at a convergence value using the cross-correlation is a multi-step process. The specification first turns to an example mathematical method, and then an example system that may be used to implement the mathematical method.

In example systems, arriving at the convergence value may be a multistep process that involves calculating the cross-correlation, and then calculating the convergence spectrum using the cross-correlation, and then calculating an average amplitude or mean value from the convergence spectrum. In particular, the example step-size controller 204 may perform, in the frequency domain, a cross-correlation of the local-microphone signal d(n) and the resultant signal e(n), such as according to the following equation:

$$r_{de}(n) = D(n)\overline{E(n)} \tag{4}$$

where $r_{de}(n)$ is the resultant of the cross-correlation, D(N) is the local-microphone signal in the frequency domain, $\overline{E(n)}$ is the complex conjugate of the E(n). The resultant of the cross-correlation $r_{de}(n)$ is an array or vector, and because in the example systems the cross-correlation is performed in the frequency domain, $r_{de}(n)$ may be referred to as cross-correlation spectrum $r_{de}(n)$. Stated differently, for many, if not all, the samples n, the step-size controller 204 may calculate the cross-correlation spectrum $r_{de}(n)$ by performing a cross-correlation between the local-microphone signal d(n) and the resultant signal e(n), both signals in the frequency domain.

The example step-size controller 204 may then calculate a convergence spectrum $\zeta_{MECC}$ according the following equation:

$$\zeta_{MECC}(n) = 1 - (r_{de}(n)/\delta^2_d) \tag{5}$$

where $\zeta_{MECC}(n)$ is the convergence spectrum, $r_{de}(n)$ is the cross-correlation spectrum, and $\delta^2_d$ is a variance of the local-microphone signal d(n) in the frequency domain. The cross-correlation spectrum $r_{de}(n)$ is divided by the scalar variance $\delta^2_d$, and the dividend (a dividend spectrum) is subtracted from one. Inasmuch as the cross-correlation spectrum $r_{de}(n)$ is an array, so too is the convergence spectrum $\zeta_{MECC}(n)$.

The example step-size controller 204 may then create the convergence value based on the convergence spectrum $\zeta_{MECC}(n)$. In particular, in example cases the step-size controller 204 may take the average of the members of the convergence spectrum $\zeta_{MECC}(n)$ according to the following equation:

$$\varphi = \frac{1}{N}\sum_{i=0}^{N-1} \zeta_{MECCi}, \tag{6}$$

where $\varphi$ is the convergence value, and N is the number of members of the convergence spectrum $\zeta_{MECC}$. The convergence value $\varphi$ is a scalar. In many cases, the convergence value $\varphi$ resides between zero and about two, in most cases between about 0.5 on the low end to about 1.2 on the upper end. The convergence value $\varphi$ being about one (e.g., between 0.98 and 1.02, inclusive) is an indication that step-size parameter is correctly adjusted to reduce the echo in the resultant signal. The convergence value $\varphi$ being higher than a predetermined upper value (e.g., above about 1.02) is an indication that the previous step-size parameter was too large, and that the next step-size parameter should be reduced in magnitude. Oppositely, the convergence value $\varphi$ being lower than a predetermined lower value (e.g., below about 0.98) is an indication that the previous step-size parameter was too small, and that the next step-size parameter should be increased in magnitude.

The example step-size controller 204 may create additional parameters useful in gauging the state of the convergence of the echo reduction. For example, the step-size controller 204 may also calculate a variance of the convergence spectrum $\zeta_{MECC}(n)$ according to the following equation:

$$\varepsilon = \frac{1}{N}\sum_{i}^{N}(\zeta_{MECCi} - \varphi)^2 \quad (7)$$

where c is the variance, and the remaining parameters are as described above. The variance value c is a scalar. The variance value c being large is an indication that the previous step-size parameter was too large, and that the current or next step-size parameter should be reduced in magnitude.

Figure 3:
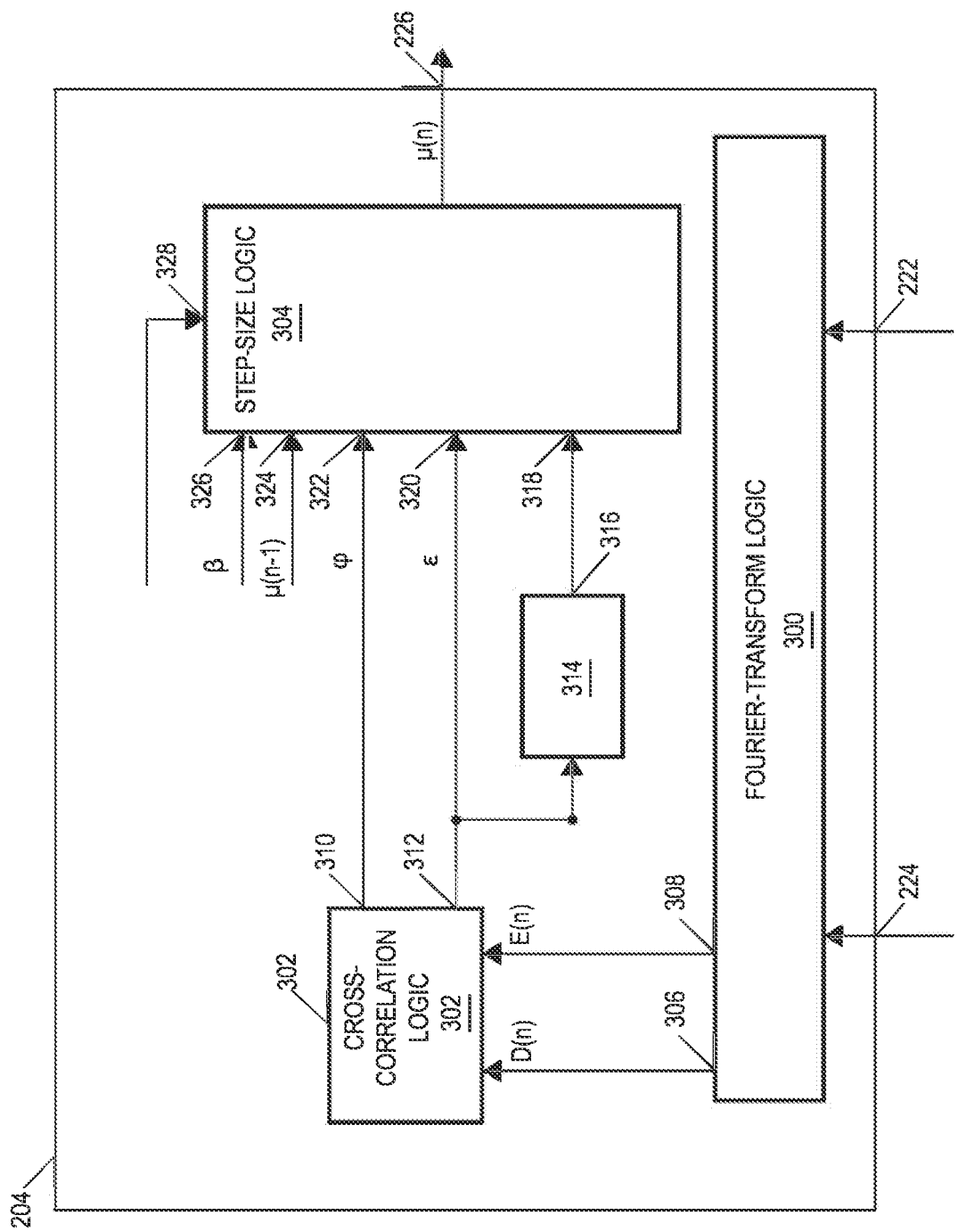
FIG. 3 shows a block diagram a step-size controller in accordance with at least some embodiments.

FIG. 3 shows a block diagram of an example step-size controller 204. In particular, the example step-size controller 204 comprises a Fourier-transform logic 300, a cross-correlation logic 302, a step-size logic 304, and a variance-trend logic 314. The example Fourier-transform logic 300 includes a first input that is the audio input 222, a second input that is the resultant input or error input 224, a microphone output 306, and a resultant output 308. The Fourier-transform logic 300 is designed and constructed to perform a Fourier transform of the local-microphone signal d(n) and thereby generate a local-microphone spectrum D(n), and to drive the local-microphone spectrum D(n) to the microphone output 306. The Fourier-transform logic 300 is also designed and constructed to perform a Fourier transform of the resultant signal e(n) and thereby generate a resultant spectrum E(n), and to drive the resultant spectrum E(n) to the resultant output 308. In one example the Fourier-transform logic 300 performs a fast-Fourier transform, but any suitable Fourier-transform method may be used.

The example step-size controller 204 further defines the cross-correlation logic 302. The example cross-correlation logic 302 defines a first input coupled to the microphone output 306, a second input coupled to the resultant output 308, a convergence output 310, and a variance output 312. The cross-correlation logic 302 is designed and constructed to perform the mathematical cross-correlation of the local-microphone spectrum D(n) and the resultant spectrum E(n) and thereby create a cross-correlation spectrum $r_{de}(n)$, such as according to Equation (4) above. Further, the example cross-correlation logic 302 is designed and constructed to calculate the convergence value φ based on the cross-correlation spectrum $r_{de}(n)$, such as according to Equation (6) above, and drive the convergence value φ to the convergence output 310. In some example cases, the cross-correlation logic 302 may also be designed and constructed to calculate the variance value c, such as according to Equation (7) above, and drive the variance value c to the variance output 312.

Still referring to FIG. 3, the example step-size controller 204 further comprises the variance-trend logic 314. The variance-trend logic 314 defines an input coupled to the variance output 312, and a trend output 316. The example variance-trend logic 314 is designed and constructed to receive each variance value c from the cross-correlation logic 302, and to produce a Boolean signal at the trend output 316. In particular, the variance-trend logic 314 asserts the trend output 316 when the variance value c(n) is smaller than a previous variance value ε(n−x). The variance trending downward indicates, in some circumstances, that the echo reduction is converging (e.g., the echo component over two or more iterations is trending downward).

The example step-size controller 204 further comprises the step-size logic 304. The example step-size logic 304 defines a trend input 318, a variance input 320, a convergence input 322, a prior-mu input 324, a beta input 326, and a condition input 328. The example step-size logic 304 further defines the step-size output 226. In some cases, the step-size logic 304 is designed and constructed to update the step-size parameter μ(n) by decreasing the step-size parameter relative to a previous step-size parameter μ(n−1) when the convergence value φ is larger than a predetermined upper value. In other cases, the step-size logic 304 is designed and constructed to update the step-size parameter μ(n) by increasing the step-size parameter relative to a previous step-size parameter μ(n−1) when the convergence value φ is smaller than a predetermined lower value. Other cases are also implemented, as explained in the flow diagram of FIG. 4.

Figure 4:
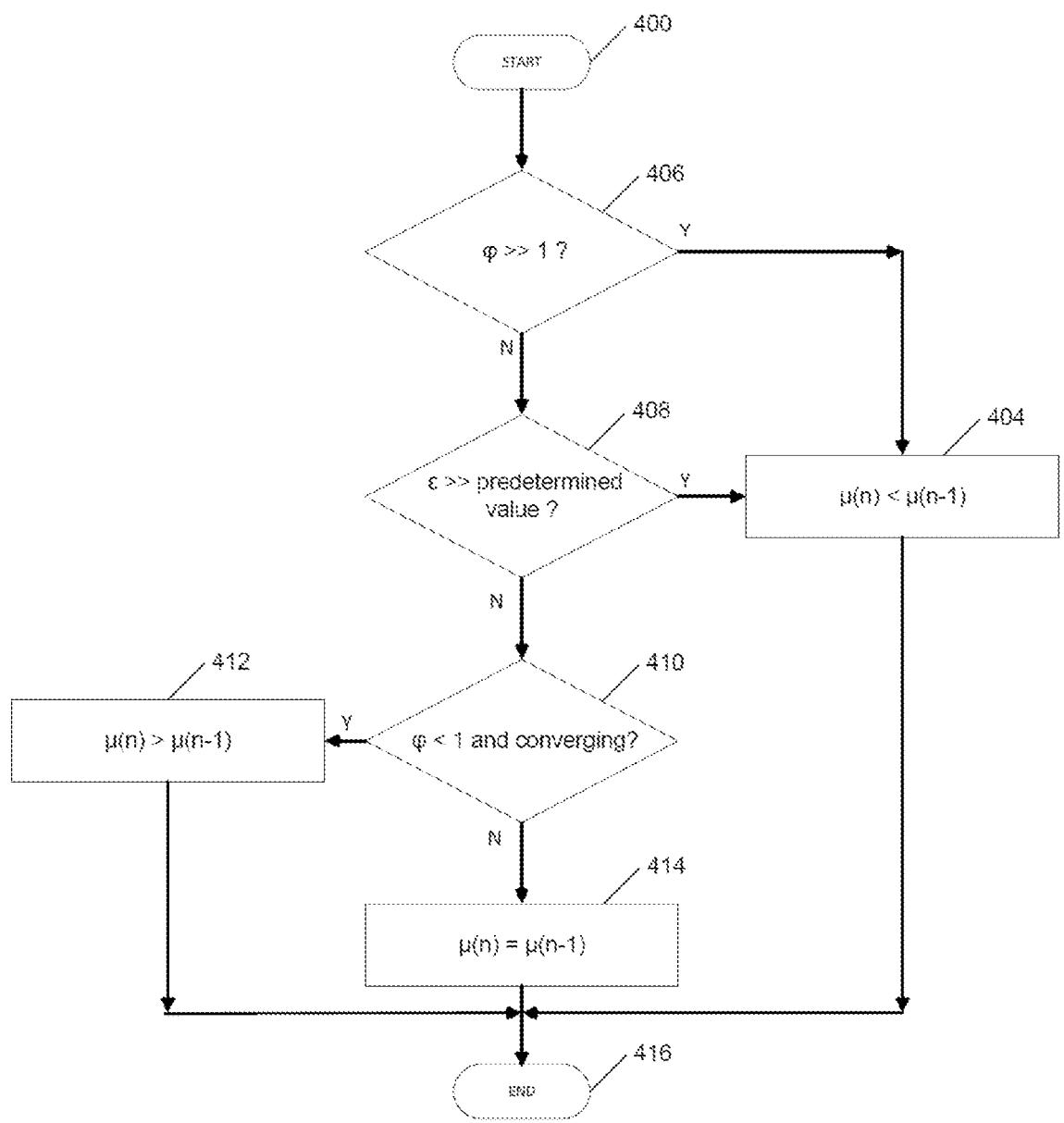
FIG. 4 shows a flow diagram of an example operation of a step-size controller in accordance with at least some embodiments.

FIG. 4 shows a flow diagram of an example operation of the step-size logic 304. In particular, the operation starts (block 400) and steps to a decision block 406 that is a determination as to whether the convergence value φ is higher than a predetermined upper value (e.g., above about 1.02). The convergence value φ being higher than the predetermined upper value is an indication that the previous step-size parameter μ(n−1) was too large, the process cannot converge, and that the next step-size parameter μ(n) should be reduced. Thus, if the decision within decision block 406 is true, the process proceeds to action block 404 which reduces the step-size parameter μ (the reduction designated in the figure as μ(n)<μ(n−1)) for the next iteration of the process by the adaptive filter 216 (FIG. 2) and channel model 218 (also FIG. 2).

Returning to decision block 406, if the decision within the decision block 406 is false (e.g., φ below about 1.02), the example process may proceed to decision block 408 that is a determination as to whether the variance values ε is above a predetermined high value. The variance value ε being above the predetermined high value is an indication that the previous step-size parameter μ(n−1) was too large, and that the step-size parameter μ(n) should be reduced. Thus, if the decision within decision block 408 is true, the process again proceeds to action block 404 which reduces the step-size parameter μ for the next iteration of the process by the adaptive filter 216 (FIG. 2) and channel model 218 (also FIG. 2).

Returning to decision block 408, if the decision within the decision block 406 is false, the example process may proceed to decision block 410 that is a determination as to whether the convergence value φ is less than about one and the echo reduction is converging (e.g., the trend input 318 is asserted). The convergence value φ being less than about one (e.g., less than 0.98) is an indication that step-size parameter μ(n−1) resulted in reduced echo in the resultant signal (confirmed by the asserted state of the trend input 318), but that convergence is too slow, and thus the next step-size parameter μ(n) may need to be increased. Thus, if the decision within decision block 410 is true, the process proceeds to action block 412 which increases the step-size parameter μ (the increase designated in the figure as μ(n)>μ(n−1)) for the next iteration of the process by the adaptive filter 216 (FIG. 2) and channel model 218 (also FIG. 2).

Returning to decision block 410, if the decision within decision block 410 is false (e.g., convergence value φ is greater than about 0.98 or the trend input 318 is de-asserted), this is an indication that the step-size parameter μ is properly updated. Thus, the example process proceeds to block 414 which leaves the step-size parameter μ unchanged (shown as in the figure as μ(n)=μ(n−1)) for the next iteration of the process by the adaptive filter 216 (FIG. 2) and channel model 218 (also FIG. 2). Thereafter the example process ends (block 416), likely to be immediately restarted (block 400). The specification now turns examples of increasing the step-size parameter ($\mu(n)>\mu(n-1)$) and decreasing the step-size parameter ($\mu(n)<\mu(n-1)$).

Returning to FIG. 3, in one example the step-size logic 304 receives a updating factor ß at the beta input 326. In example cases the step-size logic 304 uses the updating factor ß when increasing or decreasing the step-size parameter μ. In particular, when the audio system 104 (FIG. 1) is being designed, the system designer may select the updating factor ß to achieve any suitable goal. In practice, when the step-size logic 304 decreases the step-size parameter μ, the step-size logic 304 may divide the previous step-size parameter (e.g., $\mu(n-1)$) by the updating factor ß to arrive at the next step-size parameter $\mu(n)$. Stated otherwise, when decreasing the step-size parameter μ the step-size logic 304 may use the following equation:

$$\mu(n)=\mu(n-1)/ß \tag{8}$$

Similarly, when the step-size logic 304 increases the step-size parameter μ, the step-size logic 304 may multiply the previous step-size parameter (e.g., $\mu(n-1)$) by the updating factor ß to arrive at the next step-size parameter $\mu(n)$. Stated otherwise, when increasing the step-size parameter μ the step-size logic 304 may use the following equation:

$$\mu(n)=\mu(n-1)*ß. \tag{9}$$

In other examples discussed below, the increase or decrease of the step-size parameter μ is not based on the updating factor ß, and thus the beta input 326 is optional.

In other example cases, the step-size logic 304 uses a predetermined value (e.g., 8, 16, 32) when increasing or decreasing the step-size parameter μ. In particular, when the step-size logic 304 decreases the step-size parameter μ, the step-size logic 304 may divide the previous step-size parameter (e.g., $\mu(n-1)$) by the predetermined value to arrive at the current step-size parameter $\mu(n)$. Consider, as an example, that the predetermined value is 16. Thus, when decreasing the step-size parameter μ the step-size logic 304 may use the following equation:

$$\mu(n)=\mu(n-1)/16. \tag{9}$$

Similarly, when the step-size logic 304 increases the step-size parameter μ, the step-size logic 304 may multiply the previous step-size parameter (e.g., $\mu(n-1)$) by the predetermined value to arrive at the current step-size parameter $\mu(n)$. Considering again the predetermined value being 16, when increasing the step-size parameter μ the step-size logic 304 may use the following equation:

$$\mu(n)=\mu(n-1)*16. \tag{10}$$

In other examples, different predetermined values may be used.

Still referring to FIG. 3, the example step-size controller 204, particularly the step-size logic 304, is shown to define the condition input 328. Timing of the availability of the local-microphone spectrum D(n) and resultant spectrum E(n), as well as the time to performing the various computations within the cross-correlation logic 302, may be slower than the how quickly the step-size logic 304 can perform its asserted tasks. Thus, the condition input 328 may be used to pause the step-size logic 304 based on timing issues, and/or as a mechanism to trigger the step-size logic 304 to re-calculate.

Figure 5:
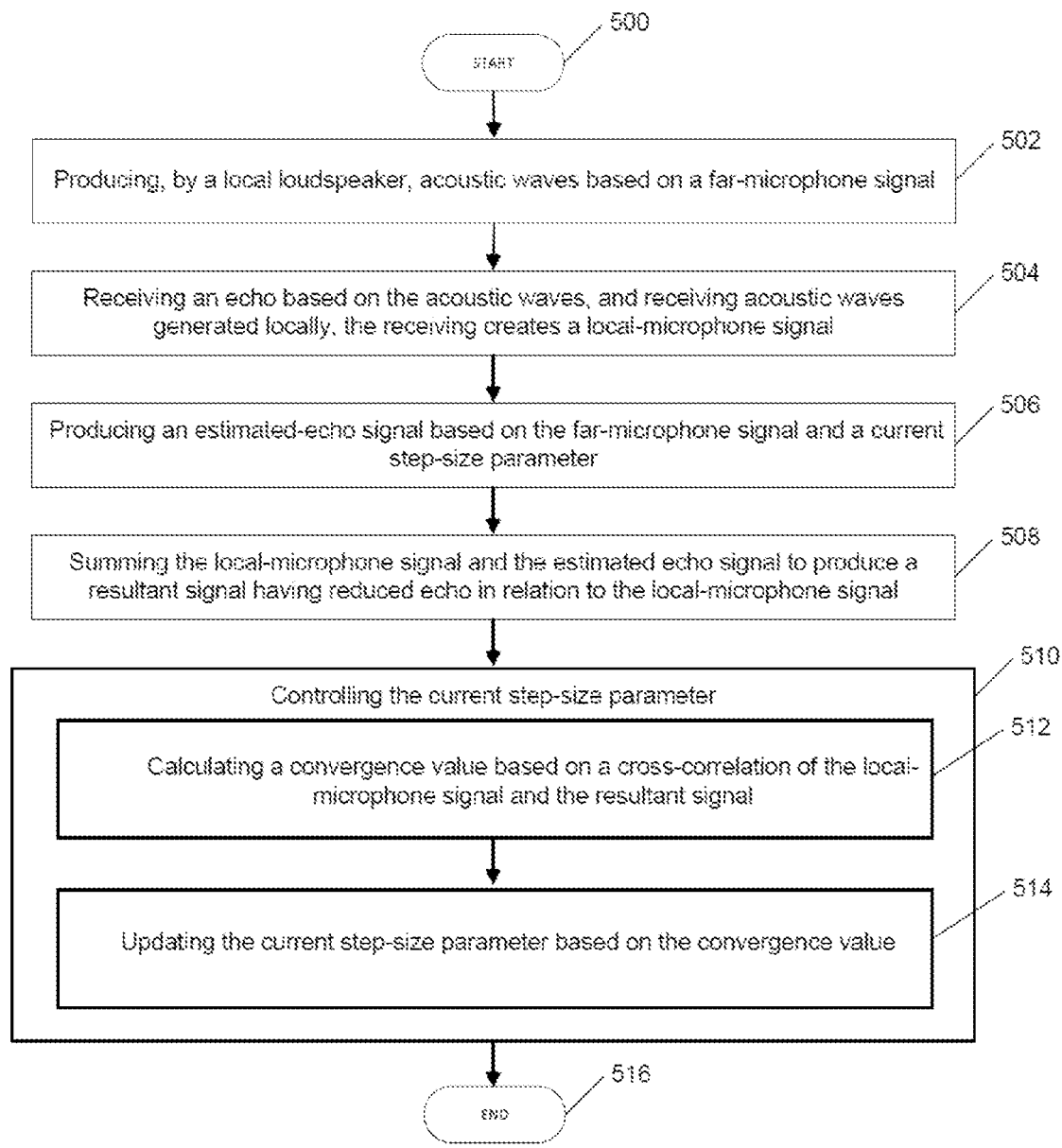
FIG. 5 shows a method in accordance with at least some embodiments.

FIG. 5 shows a method in accordance with at least some embodiments. In particular, the method starts (block 500) and may comprise: producing, by a loudspeaker, acoustic waves based on a far-microphone signal (block 502); receiving, at a local microphone, an echo based on the acoustic waves, and receiving acoustic waves generated locally, the receiving creates a local-microphone signal (block 504); producing an estimated-echo signal based on the far-microphone signal and a current step-size parameter (block 506); summing the local-microphone signal and the estimated echo signal to produce a resultant signal having reduced echo in relation to the local-microphone signal (block 508); and controlling the current step-size parameter (block 510). Controller the current step-size parameter may comprise: calculating a convergence value based on a cross-correlation of the local-microphone signal and the resultant signal (block 512); and updating the current step-size parameter based on the convergence value (block 514). Thereafter, the method ends (block 516), likely to be immediately restarted.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of echo cancellation, the method comprising:
producing, by a loudspeaker, acoustic waves based on a far-microphone signal;
receiving, at a local microphone, an echo based on the acoustic waves, and receiving acoustic waves generated locally, the receiving creates a local-microphone signal;
producing an estimated-echo signal based on the far-microphone signal and a step-size parameter;
summing the local-microphone signal and the estimated-echo signal to produce a resultant signal having reduced echo in relation to the local-microphone signal; and
controlling the step-size parameter by:
calculating a convergence value based on a cross-correlation of the local-microphone signal and the resultant signal; and
updating the step-size parameter based on the convergence value,
wherein calculating the convergence value further comprises:
converting the local-microphone signal into the frequency domain to create a local-microphone spectrum;
converting the resultant signal into the frequency domain to create a resultant spectrum;
performing a cross-correlation of the local-microphone spectrum and the resultant spectrum to create a cross-correlation spectrum; and
creating the convergence value based on the cross-correlation spectrum.

2. The method of claim 1 wherein updating the step-size parameter further comprises decreasing the current step-size parameter relative to a previous step-size parameter when the convergence value is larger than a predetermined upper value.

3. The method of claim 1 wherein updating the step-size parameter further comprises increasing the current step-size parameter relative to a previous step-size parameter when the convergence value is smaller than a predetermined lower value.

4. The method of claim 1 wherein updating the convergence value further comprises:
   calculating a variance of the local-microphone spectrum;
   dividing the cross-correlation spectrum by the variance to create a dividend spectrum; and
   subtracting the dividend spectrum from one to create a convergence spectrum; and
   calculating the convergence value as an average amplitude of members of the convergence spectrum.

5. The method of claim 1 wherein updating the step-size parameter further comprises at least one selected from a group comprising: multiplying a previous step-size parameter by a predetermined value; and dividing the previous step-size parameter by the predetermined value.

6. The method of claim 1 wherein updating the step-size parameter further comprises at least one selected from a group comprising:
   dividing a previous step-size parameter by a predetermined value to produce a quotient, and subtracting the quotient from the previous step-size parameter to produce the current step-size parameter; and
   dividing a previous step-size parameter by a predetermined value to produce a quotient, and adding the quotient to the previous step-size parameter to produce the current step-size parameter.

7. An audio processing device comprising:
   an audio-input port, an audio-output port, a microphone port, and a resultant port;
   an echo cancellation controller defining an audio input coupled to the audio-input port, an audio output coupled the audio-output port, a microphone input coupled to the microphone port, a resultant output coupled to the resultant port, and a step-size input;
   the echo cancellation controller is configured to reduce an echo received on the microphone input based on an audio signal received on the audio-input port and a step-size parameter received on the step-size input;
   a step-size controller defining a first input coupled to the microphone port, a second input coupled to the resultant output, and a step-size output coupled to the step-size input of the echo cancellation controller;
   the step-size controller configured to drive the step-size parameter to the step-size input by being configured to:
      calculate a cross-correlation of a microphone signal received on the microphone input and a resultant signal received from the resultant output;
      create a convergence value based on the cross-correlation; and
      update the step-size parameter based on the convergence value,
   wherein the step-size controller further comprises:
      a Fourier-transform logic defining a first input coupled to the microphone input, a second input coupled to the resultant output, a microphone output, and a resultant output;
      the Fourier-transform logic configured to generate a microphone spectrum from the microphone signal and to drive the microphone spectrum to the microphone output, and the Fourier-transform logic configured to generate a resultant spectrum from the resultant signal and drive the resultant spectrum to the resultant output of the Fourier-transform logic;
      a cross-correlation logic having a first input coupled to the microphone output, and a second input coupled to the resultant output, and a convergence output;
      the cross-correlation logic configured to perform a cross-correlation of the microphone spectrum and the resultant spectrum to create a cross-correlation spectrum; and
      the cross-correlation logic configured to create the convergence value based on the cross-correlation spectrum, and drive the convergence value to the convergence output.

8. The audio processing device of claim 7 further comprising:
   a step-size logic defining a convergence input coupled to convergence output, and the step-size output; and
   the step-size logic configured to update the step-size parameter by decreasing the step-size parameter relative to a previous step-size parameter when the convergence value is larger than a predetermined upper value.

9. The audio processing device of claim 7 further comprising:
   a step-size logic defining a convergence input coupled to convergence output, and the step-size output; and
   the step-size logic configured to update the step-size parameter by increasing the step-size parameter relative to a previous step-size parameter when the convergence value is smaller than a predetermined lower value.

10. The audio processing device of claim 7 further comprising the cross-correlation logic defines a variance output, and the cross-correlation logic is configured to
   calculate a variance of the cross-correlation spectrum;
   divide the cross-correlation spectrum by the variance to create a dividend spectrum;
   subtract the dividend spectrum from one to create a convergence spectrum; and
   calculate the convergence value as an average amplitude of members of the convergence spectrum.

11. The audio processing device of claim 7 wherein when the step-size controller updates the step-size parameter, the step-size controller is further configured to at least one selected from a group comprising: multiply a previous step-size parameter by a predetermined value; and divide the previous step-size parameter by the predetermined value.

12. The audio processing device of claim 7 wherein when the step-size controller updates the step-size parameter, the step-size controller is further configured to at least one selected from a group comprising:
   divide a previous step-size parameter by a predetermined value to produce a quotient, and subtracting the quotient from the previous step-size parameter to produce the step-size parameter; and
   divide a previous step-size parameter by a predetermined value to produce a quotient, and adding the quotient to the previous step-size parameter to produce the step-size parameter.

13. An audio system comprising:
   a loudspeaker;
   a microphone;
   an audio processing device comprising
      an audio-input port, and a resultant port;
      an echo cancellation controller defining an audio input coupled to the audio-input port, an audio output coupled the loudspeaker, a microphone input coupled to the microphone, a resultant output coupled to the resultant port, and a step-size input;

the echo cancellation controller is configured to reduce an echo received on the microphone based on an audio signal received on the audio-input port and a step-size parameter received on the step-size input;

a step-size controller defining a microphone input coupled to the microphone, a resultant input coupled to the resultant output, and a step-size output coupled to the step-size input of the echo cancellation controller;

the step-size controller configured to drive the step-size parameter to the step-size input by being configured to:

calculate a cross-correlation of a microphone signal received from the microphone and a resultant signal received on the resultant input;

create a convergence value based on the cross-correlation; and update the step-size parameter based on the convergence value, wherein the step-size controller further comprises:

a Fourier-transform logic defining a first input coupled to the microphone, a second input coupled to the resultant output, a microphone output, and a resultant output;

the Fourier-transform logic configured to generate a microphone spectrum from the microphone signal and to drive the microphone spectrum to the microphone output, and the Fourier-transform logic configured to generate a resultant spectrum from the resultant signal and drive the resultant spectrum to the resultant output of the Fourier-transform logic;

a cross-correlation logic having a first input coupled to the microphone output, and a second input coupled to the resultant output, and a convergence output;

the cross-correlation logic configured to perform a cross-correlation of the microphone spectrum and the resultant spectrum to create a cross-correlation spectrum; and the cross-correlation logic configured to create the convergence value based on the cross-correlation spectrum, and drive the convergence value to the convergence output.

14. The audio system of claim 13 further comprising:

a step-size logic defining a convergence input coupled to the convergence output, and the step-size output; and the step-size logic configured to update the step-size parameter by decreasing the step-size parameter relative to a previous step-size parameter when the convergence value is larger than a predetermined upper value.

15. The audio system of claim 13 further comprising:

a step-size logic defining a convergence input coupled to convergence output, and the step-size output; and the step-size logic configured to update the step-size parameter by increasing the step-size parameter relative to a previous step-size parameter when the convergence value is smaller than a predetermined lower value.

16. The audio system of claim 13 further comprising the cross-correlation logic defines a variance output, and the cross-correlation logic is configured to calculate a variance of the cross-correlation spectrum;

divide the cross-correlation spectrum by the variance to create a dividend spectrum; and subtract the dividend spectrum from one to create a convergence spectrum; and calculate the convergence value as an average amplitude of members of the convergence spectrum.

17. The audio system of claim 13 wherein when the step-size controller updates the step-size parameter, the step-size controller is further configured to at least one selected from a group comprising: multiply a previous step-size parameter by a predetermined value; and divide the previous step-size parameter by the predetermined value.

\* \* \* \* \*